(12) United States Patent
Moniz et al.

(10) Patent No.: US 8,734,091 B2
(45) Date of Patent: May 27, 2014

(54) AXIAL COMPRESSOR WITH ARRANGEMENT FOR BLEEDING AIR FROM VARIABLE STATOR VANE STAGES

(75) Inventors: Thomas Ory Moniz, Cincinnati, OH (US); Thomas Viars, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 492 days.

(21) Appl. No.: 13/094,934

(22) Filed: Apr. 27, 2011

(65) Prior Publication Data

US 2012/0275912 A1  Nov. 1, 2012

(51) Int. Cl.
*F01D 17/16*  (2006.01)

(52) U.S. Cl.
USPC ........................................... 415/144; 415/160

(58) Field of Classification Search
CPC ............................. F04D 27/005; F04D 27/009
USPC ........ 415/144, 14, 5, 159, 160, 145, 115, 116
See application file for complete search history.

(56) References Cited

U.S. PATENT DOCUMENTS

| | | | |
|---|---|---|---|
| 3,945,759 A | | 3/1976 | Bobo |
| 3,996,964 A | * | 12/1976 | McCombs ................... 137/885 |
| 4,390,318 A | * | 6/1983 | Weiler .......................... 415/145 |
| 4,791,783 A | * | 12/1988 | Neitzel ............................ 60/262 |
| 5,155,993 A | | 10/1992 | Baughman et al. |
| 5,209,633 A | | 5/1993 | McGreehan et al. |
| 6,109,868 A | | 8/2000 | Bulman et al. |
| 6,325,595 B1 | | 12/2001 | Breeze-Stringfellow et al. |
| 6,438,941 B1 | * | 8/2002 | Elliott et al. ................. 60/226.1 |
| 6,550,254 B2 | | 4/2003 | Proctor et al. |
| 7,264,441 B2 | * | 9/2007 | Loudet .......................... 415/144 |
| 7,624,581 B2 | | 12/2009 | Moniz |
| 8,182,209 B2 | * | 5/2012 | Brault et al. .................. 415/144 |
| 8,388,308 B2 | * | 3/2013 | Karafillis et al. ............. 415/145 |
| 2010/0232935 A1 | * | 9/2010 | Twell ............................. 415/151 |

FOREIGN PATENT DOCUMENTS

| | | | |
|---|---|---|---|
| FR | 2 601 074 | * | 1/1988 |
| GB | 2 230 822 | * | 10/1990 |

OTHER PUBLICATIONS

Naudet, Turbomachine fitted with a device for flow rate of ventilation air bled off for the controlling the clearance between rotor and stator, FR 2 601 074 Abstract.*

* cited by examiner

*Primary Examiner* — Edward Landrum
*Assistant Examiner* — Liam McDowell
(74) *Attorney, Agent, or Firm* — William Scott Andes; Trego, Hines & Ladenheim, PLLC (57) ABSTRACT

A compressor includes: a compressor spool rotatable about an axis carrying axially-spaced-apart blade rows of compressor blades; a casing surrounding the compressor blades, the casing carrying a liner assembly defining a boundary of a primary compressor flowpath; and a plurality of axially-spaced-apart stator rows of stator vanes carried by the liner assembly, the stator rows alternating axially with the blade rows. At least some of the stator rows are variable stator rows, the stator vanes of which are mounted on trunnions passing through the casing, and are pivotable relative to the casing. An actuator arm is coupled to each trunnions, outside the casing. At least one first bleed slot passes through the liner structure between axially adjacent first and second ones of the variable stator rows; and a first flow path defined by the casing communicates with the first bleed slot and with the exterior of the casing.

9 Claims, 7 Drawing Sheets

AXIAL COMPRESSOR WITH ARRANGEMENT FOR BLEEDING AIR FROM VARIABLE STATOR VANE STAGES

BACKGROUND OF THE INVENTION

This invention relates generally to thermodynamics in gas turbine engines and more particularly to apparatus for extracting bleed air in such engines.

A gas turbine engine includes a turbomachinery core having a high pressure compressor, combustor, and high pressure turbine in serial flow relationship. The core is operable in a known manner to generate a primary flow of propulsive gas. A typical turbofan engine adds a low pressure turbine driven by the core exhaust gases which in turn drives a fan rotor through a shaft to generate a bypass flow of propulsive gas. In the case of a high bypass engine this provides the majority of the total engine thrust.

A typical axial flow high pressure compressor in such an engine includes a number of stages. Each stage has a row of rotating airfoils or blades and row of stationary airfoils or vanes. The vanes serve to turn the airflow exiting an upstream row of blades before it enters the downstream row of blades. It is known to construct one or more rows of vanes so that their angle of incidence can be changed in operation. These are referred to as variable stator vanes or simply "VSVs". The VSVs enable throttling of flow through the compressor so that it can operate efficiently at different flow rates, without the losses incurred by other mechanisms such as bleed valves. Because of high overall pressure ratios and stage count in many compressors, there will often be many stages of VSVs.

It is known to extract high-pressure compressed air from the high pressure compressor. This referred to as "bleed air" and may be used for purposes such as engine or aircraft anti-icing, boundary layer control devices, aircraft environmental control systems and the like. For optimal engine performance, bleed should occur at the stage that provides the minimum source pressure the user requires. However, in the prior art, sources have been limited to stages aft of the last VSV stage, because of the structural difficulty of extracting air from the VSV stages. Thus, the only conveniently available bleed source is at an undesirably high pressure.

Accordingly, there is a need for a compressor which allows air to be bled from the VSV stages.

BRIEF DESCRIPTION OF THE INVENTION

This need is addressed by the present invention, which provides a compressor bleed apparatus which bleeds air between VSV stages and provides a path for the air to be extracted clear of structure external to the compressor casing.

According to one aspect of the invention a compressor apparatus includes: a compressor spool mounted for rotation about a centerline axis and carrying a plurality of axially-spaced-apart blade rows, each blade row including an annular array of airfoil-shaped compressor blades; a casing surrounding the compressor blades, the casing carrying a liner assembly which defines a boundary of a primary gas flowpath through the compressor; a plurality of axially-spaced-apart stator rows carried by the liner assembly, each stator row including an annular array of airfoil-shaped stator vanes, wherein the stator rows alternate axially with the blade rows, wherein at least some axially adjacent ones of the stator rows are variable stator rows, the stator vanes of which are mounted on trunnions passing through the casing, so as to be pivotable relative to the casing; an actuator arm coupled to each of the trunnions, outside the casing; at least one first bleed slot passing through the liner structure between axially adjacent first and second ones of the variable stator rows; and a first flow path defined by the casing, communicating with the at least one first bleed slot and with the exterior of the casing.

BRIEF DESCRIPTION OF THE DRAWINGS

The invention may be best understood by reference to the following description taken in conjunction with the accompanying drawing figures in which.

DETAILED DESCRIPTION OF THE INVENTION

Figure 1:
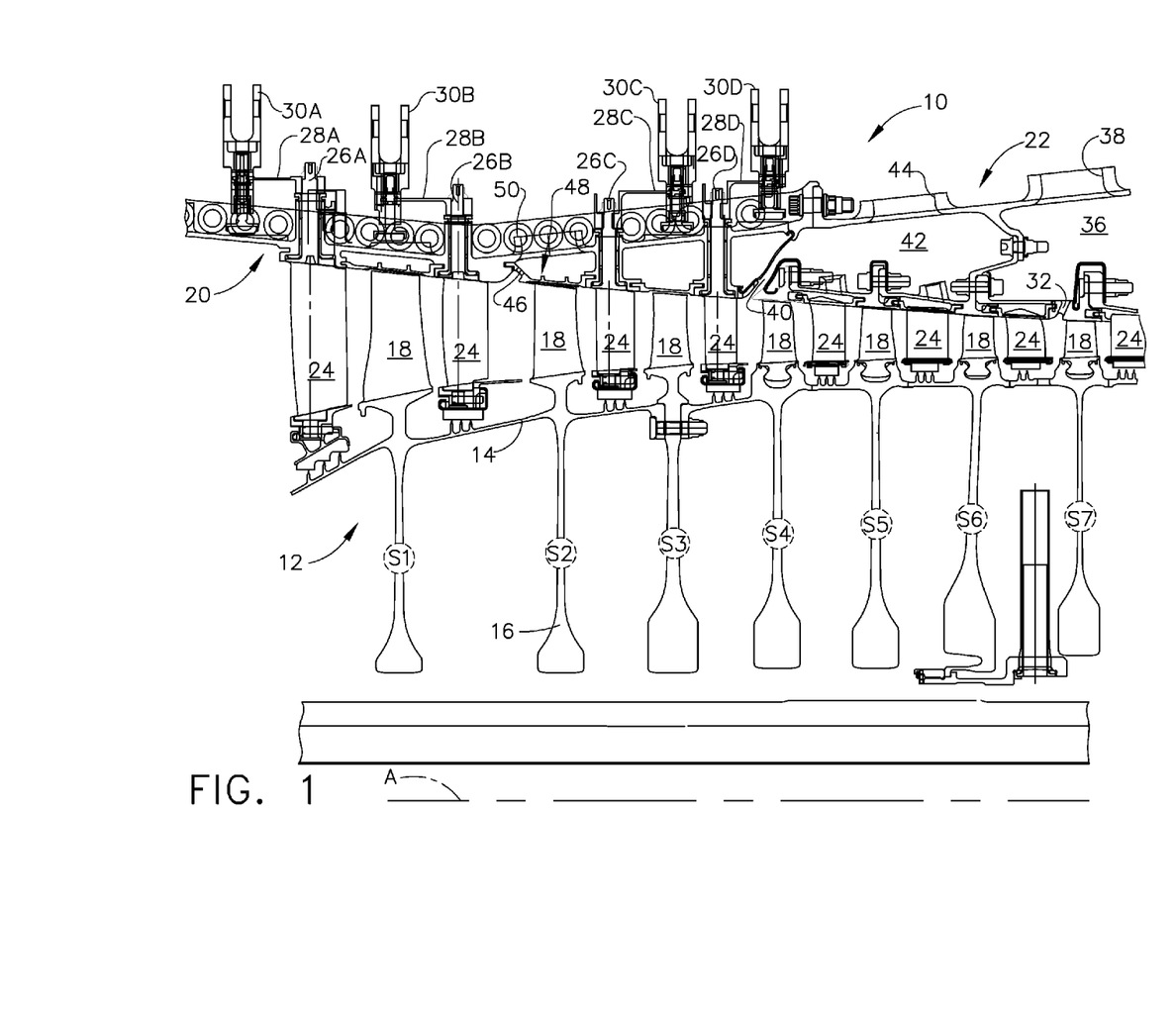
FIG. 1 is a half cross-sectional view of a high pressure compressor of a gas turbine engine, constructed in accordance with an aspect of the present invention.

Referring to the drawings wherein identical reference numerals denote the same elements throughout the various views, FIG. 1 depicts a portion of a high pressure compressor 10, which is part of a gas turbine engine as described above. The compressor 10 includes an axially-elongated annular spool 12 mounted for rotation about a centerline axis "A". The spool 12 may be built up from several smaller components. In accordance it includes one or more drum portions 14 and several annular disks 16 which all rotate together as a unit. The spool 12 is depicted in half-section but it will be understood that it is a body of revolution. Several blade rows are carried at the outer periphery of the spool 12. Each blade row comprises an annular array of airfoil-shaped compressor blades 18 which extend radially outward from the spool 12. An annular liner assembly 20 closely surrounds the compressor blades 18 and defines the radially outer boundary of a primary gas flowpath through the compressor 10. The liner assembly 20 is built up from a plurality of smaller components, some of which will be described in more detail below. An annular casing 22 surrounds the liner assembly 20 and provides structural support to it. Several stator rows are carried by the liner assembly 20. Each stator row comprises an annular array of airfoil-shaped stator vanes 24 which extend radially inward from the liner assembly 20. The stator rows alternate with the blade rows in the axial direction. Each blade row and the axially downstream stator row constitute a "stage" of the compressor 10. In operation, the compressor 10 draws in air (from the left side of the figure) and compresses it as it pumps it axially downstream, towards the right side of the figure. Each stage contributes an incremental pressure rise to the air, with the highest pressure being at the exit of the last stage.

In the illustrated example, only some of the stages of the compressor 10 are shown. The stages forward and aft of those illustrated are not of consequence to the invention. The stages which are shown are labeled sequentially "S1" through "S7". These numbers are used solely for the sake of easy reference and do not necessarily correspond to the actual number of the stages in the complete compressor 10. The four stages S1 through S4 shown on the left side of the figure (towards an inlet end of the compressor 10) incorporate variable stator vanes or simply "VSVs"; the stator vanes 24 of these stages are constructed so that their angle of incidence can be changed in operation (i.e. these stator vanes 24 can be pivoted about the radial axes shown in dashed lines). The remaining stages to the right side of the figure (towards an exit end of the compressor) do not incorporate VSVs. It is noted that the principles of the present invention are generally applicable to any axial compressor having two or more axially adjacent stages of VSVs, without regard to the total number of stages, or how many stages include VSVs. The VSVs enable throttling of flow through the compressor 10 in a known manner, so that it can operate efficiently at both high and low mass flow rates. The stator vane 24 of each stage S1 through S4 has a corresponding trunnion (generically referred to as "26" and labeled 26A through 26D, respectively) that extends radially outward through the liner assembly 20 and the casing 22. An actuator arm (generically referred to as "28" and labeled 28A through 28D, respectively) is attached to the distal end of each trunnion 26A-26D. All of the actuator arms 28A-28D for an individual stage are coupled together by a ring 30 (generically referred to as "30" and labeled 30A through 30D, respectively). Rotation of the rings 30A-30D about the engine's longitudinal axis A thus causes all of the actuator arms 28 coupled to that specific ring 30A-30D to move in unison, in turn pivoting all of the trunnions 26A-26D with their attached stator vanes 24 in unison.

In this particular example a rear bleed slot 32, which may comprise an annular array of individual slots, penetrates the liner assembly 20 aft of the stage S6. The rear bleed slot 32 communicates with a rear plenum 36 defined between the liner assembly 20 and the casing 22. One or more rear extraction ports 38 in the casing 22 provide a location to extract the air from the rear plenum 36. In use the rear extraction port 38 would be coupled to appropriate pipework or ducting external to the casing 22 (not shown).

A middle bleed slot 40, which may comprise an annular array of individual slots, penetrates the liner assembly 20 aft of the stage S3. The middle bleed slot 40 communicates with a middle plenum 42 defined between the liner assembly 20 and the casing 22 and isolated from the rear plenum 36. One or more middle extraction ports 44 in the casing 22 provide a location to extract the air from the middle plenum 42. In use this extraction port 44 would be coupled to appropriate pipework or ducting external to the casing 22 (not shown).

A forward bleed slot 46, which may comprise an annular array of individual slots, penetrates the liner assembly 20 aft of the stage S1. The forward bleed slot 46 communicates with a forward plenum 48 defined between the liner assembly 20 and the casing 22 and isolated from the rear and middle plenums 36 and 42. One or more forward extraction ports 50 in the casing 22 provide a place to extract the air from the forward plenum 48. In use this extraction port 50 would be coupled to appropriate pipework or ducting external to the casing 22 (not shown).

Figure 2:
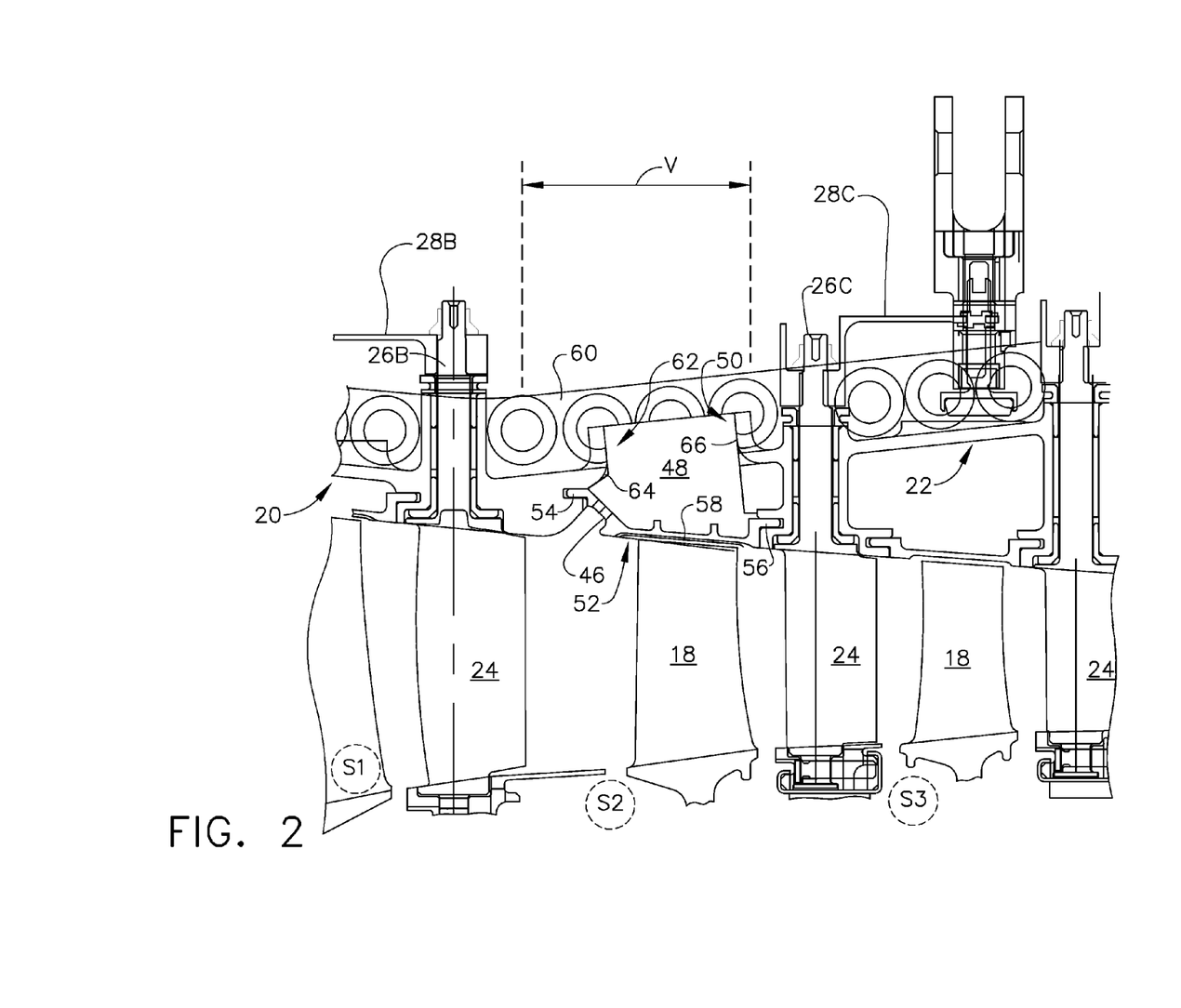
FIG. 2 is an enlarged view of a portion of FIG. 1.

FIG. 2 illustrates in more detail the structure used to bleed air between the stages S1 and S2. An annular shroud 52 surrounds the compressor blade 18 as described above. The shroud 52 may be made up of a plurality of segments arranged in a ring to form a complete 360 degree assembly. The shroud segments may include forward and aft rails 54 and 56 to mount them in slots in the adjacent portions of the liner assembly 20. The forward bleed slots 46 described above are formed in the shroud 52 and communicate with the forward plenum 48. In this particular example the forward bleed slots 46 are disposed between the forward rail 54 and the generally tapered-cylindrical central portion 58 of the shroud 52. A typical construction would have the liner assembly 20 comprised of a ring of segments and the casing 22 formed in two sections bolted together at a split line flange 60. To avoid leakage at the joints between these components, a duct 62 may be positioned in the third plenum 48. As an example, it may have a forward wall 64 and an aft wall 66 which define a flowpath between the shroud 52 and the extraction port 50. The duct 62 may be made from two or more arcuate segments assembled into a complete annular shape.

The forward plenum 48 lies axially between two stages having VSVs. In order to provide adequate space to bleed air from the stage S1 and extract that air from the forward plenum 48, the operating hardware of the VSVs is positioned differently than in prior art practice. Specifically, the actuator arms 28B of the stage S1 extend axially forward, while the actuator arms 28C of the stage S2 extend axially rearward. As used herein, the term "axially" refers to directions parallel to the longitudinal axis A shown in FIG. 1. This creates an open void "V" outboard of the casing 22, denoted by dashed lines in FIG. 2, not present in prior art configurations. The open void V permits the connection of external pipes or ductwork (not shown) to the extraction port 50.

In operation, air can be bled from the stages S1, S3, and S6, providing air flows at three discrete pressures. As much of the bleed air as possible would be extracted at the lowest possible pressure (i.e. the most forward stage possible) in order to minimize the impact on efficiency and specific fuel consumption ("SFC"). In contrast with prior art bleed arrangements, air may be extracted at a desired pressure despite the fact that such pressure is found at the location of the VSV stages.

Figure 3:
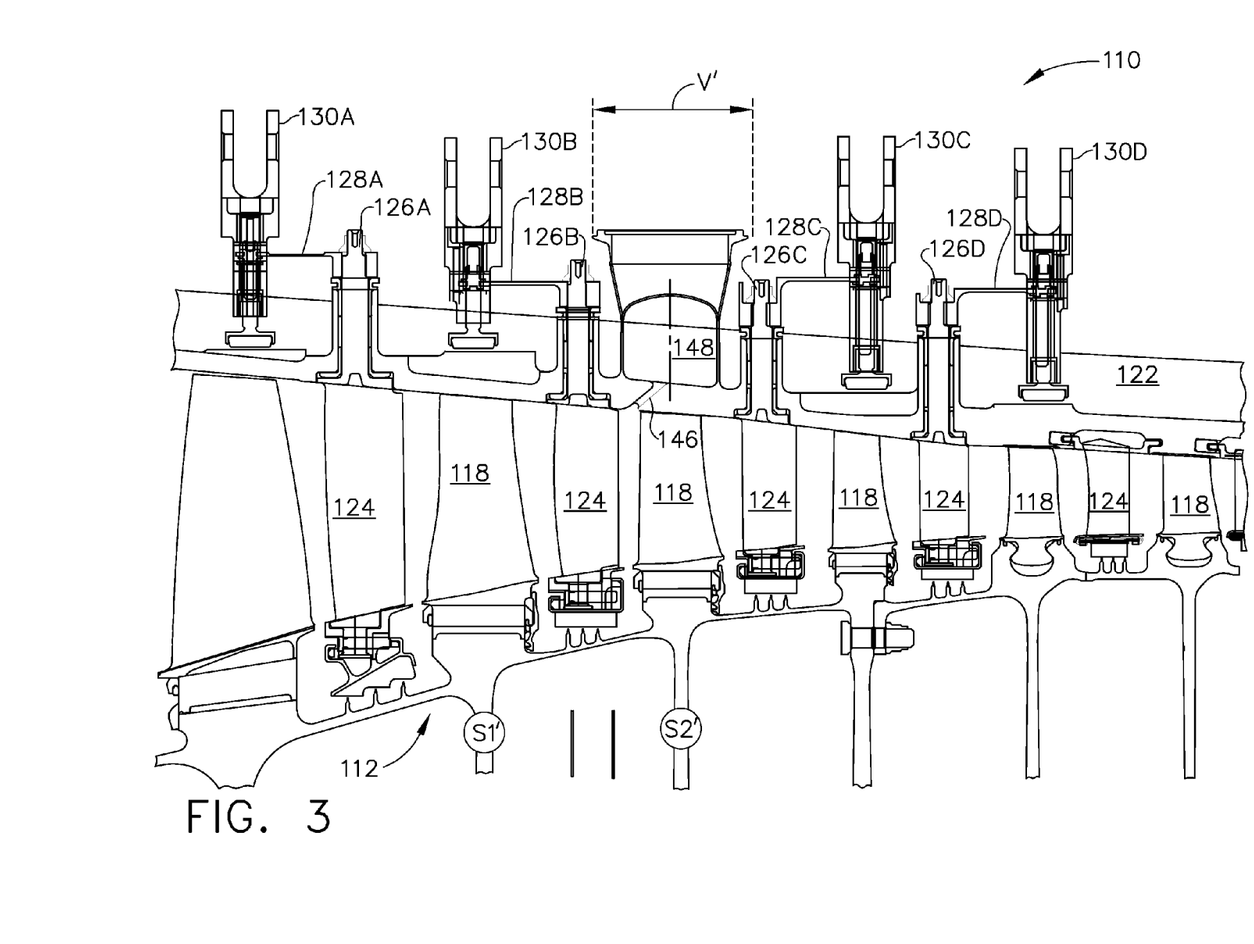
FIG. 3 is a half cross-sectional view of an alternative high pressure compressor of a gas turbine engine, constructed in accordance with an aspect of the present invention.

A similar air bleed configuration may be implemented in a compressor 110 in which the casing and liner are integrated into a single wall. For example, FIG. 3 illustrates a portion of a compressor having a spool 112, compressor blades 118, and stator vanes 124. An annular casing 122 surrounds the compressor blades 118 and serves both as a mount for the stator vanes 124 and as a shroud for the compressor blades 118. In effect, it comprises a casing and a liner assembly as described above, in one integral unit. Some of the stator vanes 124 are variable-angle (or "VSVs") and include trunnions 126A-126D coupled to actuator arms 128A-128D and rings 130A-130D, respectively. For illustrative purposes the stator vanes 124 of two axially-adjacent stages will be described. One stage labeled S1' includes a trunnion 126A, an actuator arm 128A, and a ring 130A. The stage S2' immediately downstream of the stage S1' includes a trunnion 126B, an actuator arm 128B, and a ring 130B. The actuator arm 128A extends axially forward and the actuator arm 128B extends axially rearward, creating a void "V'" shown by dashed lines. A bleed slot 146 is formed through the casing 122 and communicates with a plenum 148. Because of the presence of the void V', the plenum 148 can in turn be coupled to appropriate piping or ductwork (not shown).

Figure 4:
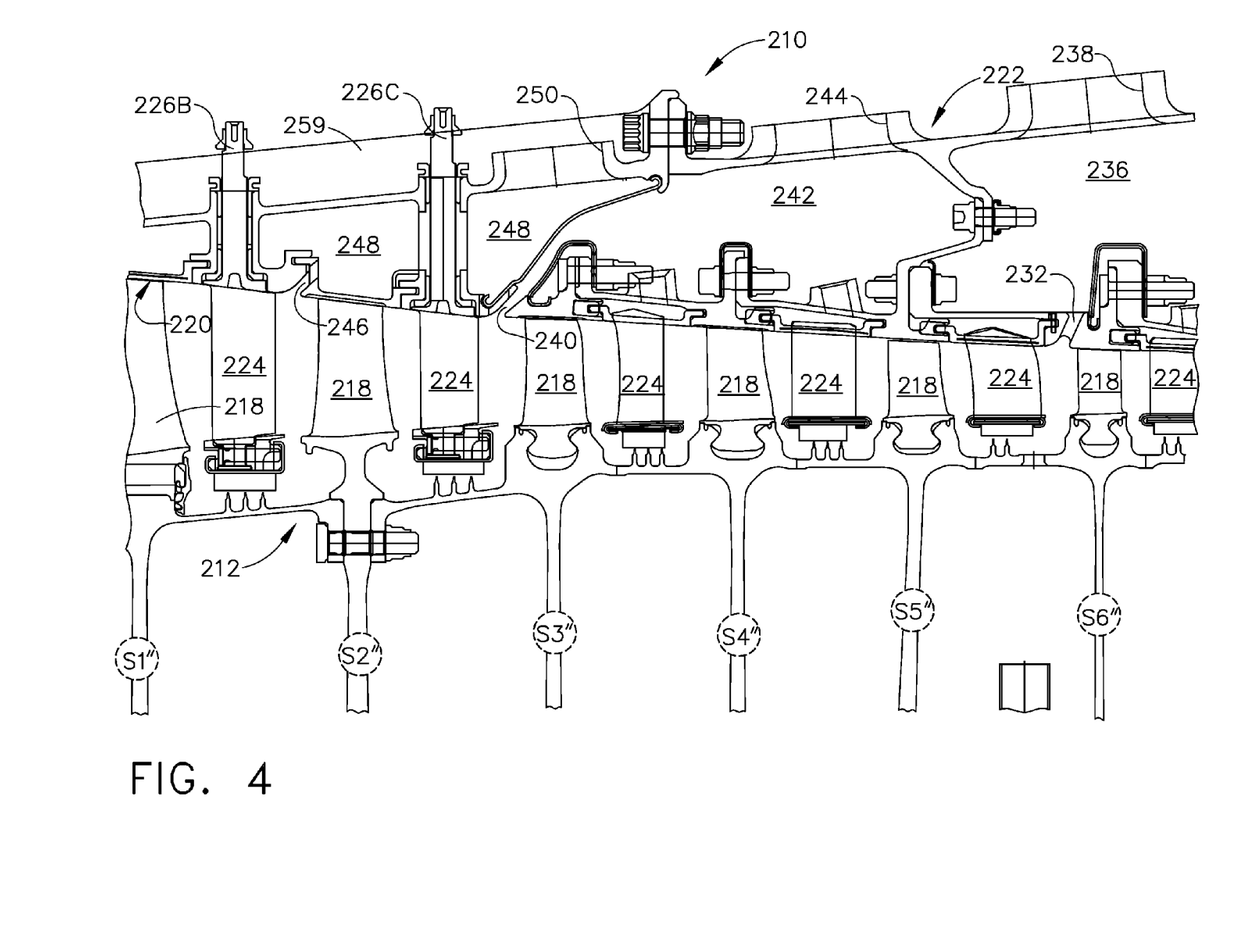
FIG. 4 is a half cross-sectional view of another alternative high pressure compressor of a gas turbine engine, constructed in accordance with an aspect of the present invention.

FIG. 4 illustrates an alternative configuration for bleeding air from a compressor. The figures shows a portion of a high pressure compressor 210, which is part of a gas turbine engine as described above and is similar in overall construction to the compressor 10 and components which are identical to the compressor 10 will be described in abbreviated fashion. The compressor 210 includes an annular spool 212 with blade rows of compressor blades 218. An annular liner assembly 220 closely surrounds the compressor blades 218 and defines the radially outer boundary of a primary gas flowpath through the compressor 210. The liner assembly 220 is built up from a plurality of smaller components, some of which will be described in more detail below. An annular casing 222 surrounds the liner assembly 220 and has several stator rows of stator vanes 224.

In the illustrated example, only some of the stages of the compressor 210, labeled "S1''" through "S6''" are shown. As noted above, these numbers are used solely for the sake of easy reference and do not necessarily correspond to the actual number of the stages in the complete compressor 210. The first three stages shown (i.e. S1"-S3") incorporate variable stator vanes as described above. The vane 224 of each stage S1" through S3" has a corresponding trunnion that extends radially outward through the liner assembly 220 and the casing 222. The trunnions of stages S2" and S3" are labeled 226B and 226C, respectively. The trunnions of stage S1" are not shown. The actuating hardware for the trunnions is not shown.

A rear bleed slot 232, which may comprise an annular array of individual slots, penetrates the liner assembly 220 aft of the stage S5". The rear bleed slot 232 communicates with a rear plenum 236 defined between the liner assembly 220 and the casing 222. One or more rear extraction ports 238 in the casing 222 provide a location to extract the air from the rear plenum 236. In use the rear extraction port 238 would be coupled to appropriate pipework or ducting external to the casing 222 (not shown).

A middle bleed slot 240, which may comprise an annular array of individual slots, penetrates the liner assembly 220 aft of the stage S2". The middle bleed slot 240 communicates with a middle plenum 242 defined between the liner assembly 220 and the casing 222 and isolated from the rear plenum 236. One or more middle extraction ports 244 in the casing 222 provide a location to extract the air from the middle plenum 242. In use the middle extraction port 244 would be coupled to appropriate pipework or ducting external to the casing 222 (not shown).

A forward bleed slot 246, which may comprise an annular array of individual slots, penetrates the liner assembly 220 aft of the stage S1". The forward bleed slot 246 communicates with a forward plenum 248 defined between the liner assembly 220 and the casing 222 and isolated from the rear and middle plenums 236 and 242. One or more forward extraction ports 250 in the casing 222 provide a place to extract the air from the forward plenum 248. In use this forward extraction port 250 would be coupled to appropriate pipework or ducting external to the casing 222 (not shown).

Figure 5:
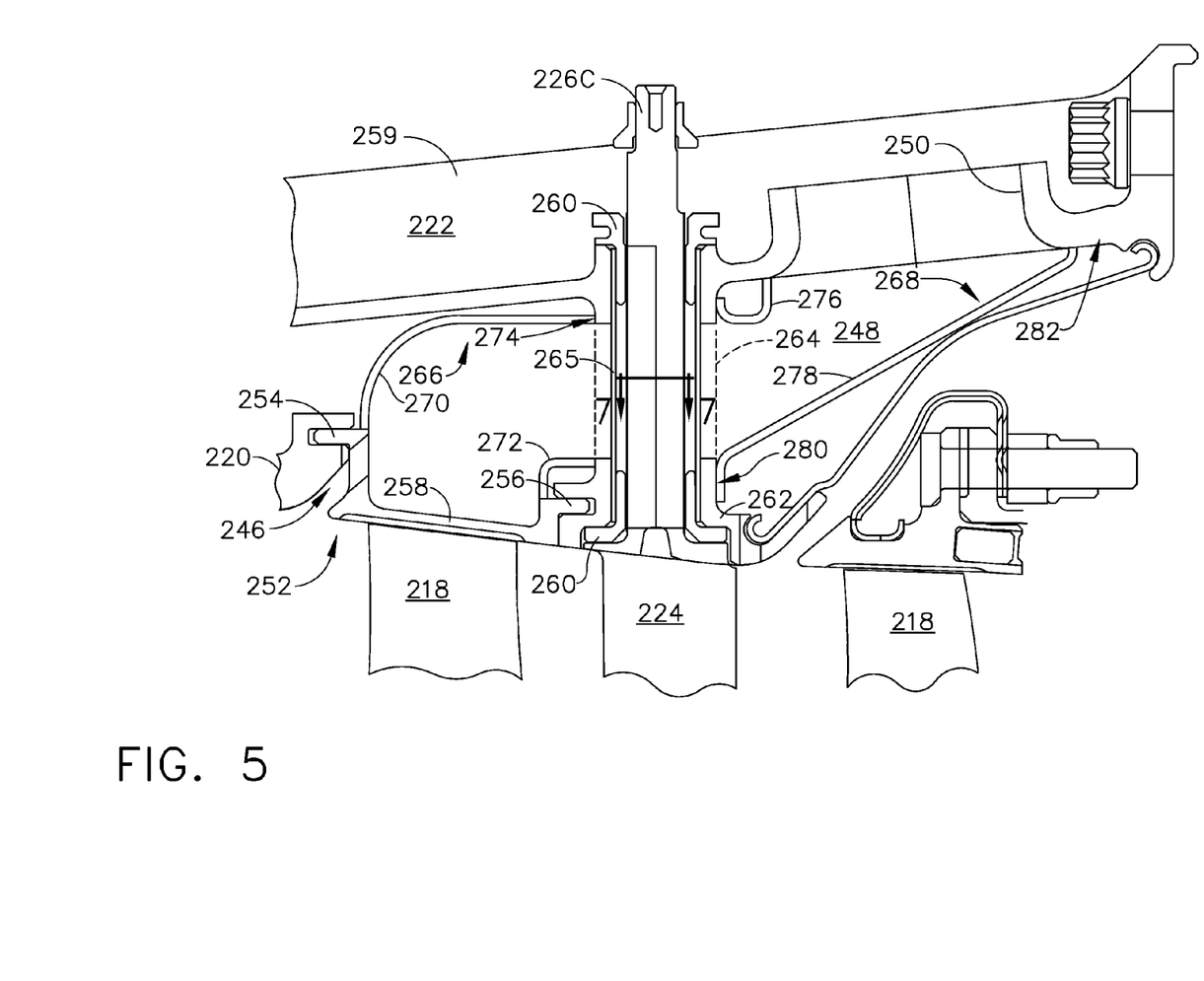
FIG. 5 is an enlarged view of a portion of FIG. 4, showing an optional duct and sleeve.

FIG. 5 illustrates in more detail the structure used to bleed air from the stage S1. An annular shroud 252 surrounds the compressor blades 218 as described above. The shroud 252 may be made up of a plurality of segments arranged in a ring to form a complete 360-degree assembly. The shroud segments may include forward and aft rails 254 and 256 to mount them in slots in the surrounding portions of the liner assembly 220. The forward bleed slots 246 described above are formed in the shroud 252 and communicate with the forward plenum 248. In this particular example the forward bleed slots 246 are disposed between the forward rail 254 and the generally tapered-cylindrical central portion 258 of the shroud 252.

Figure 6:
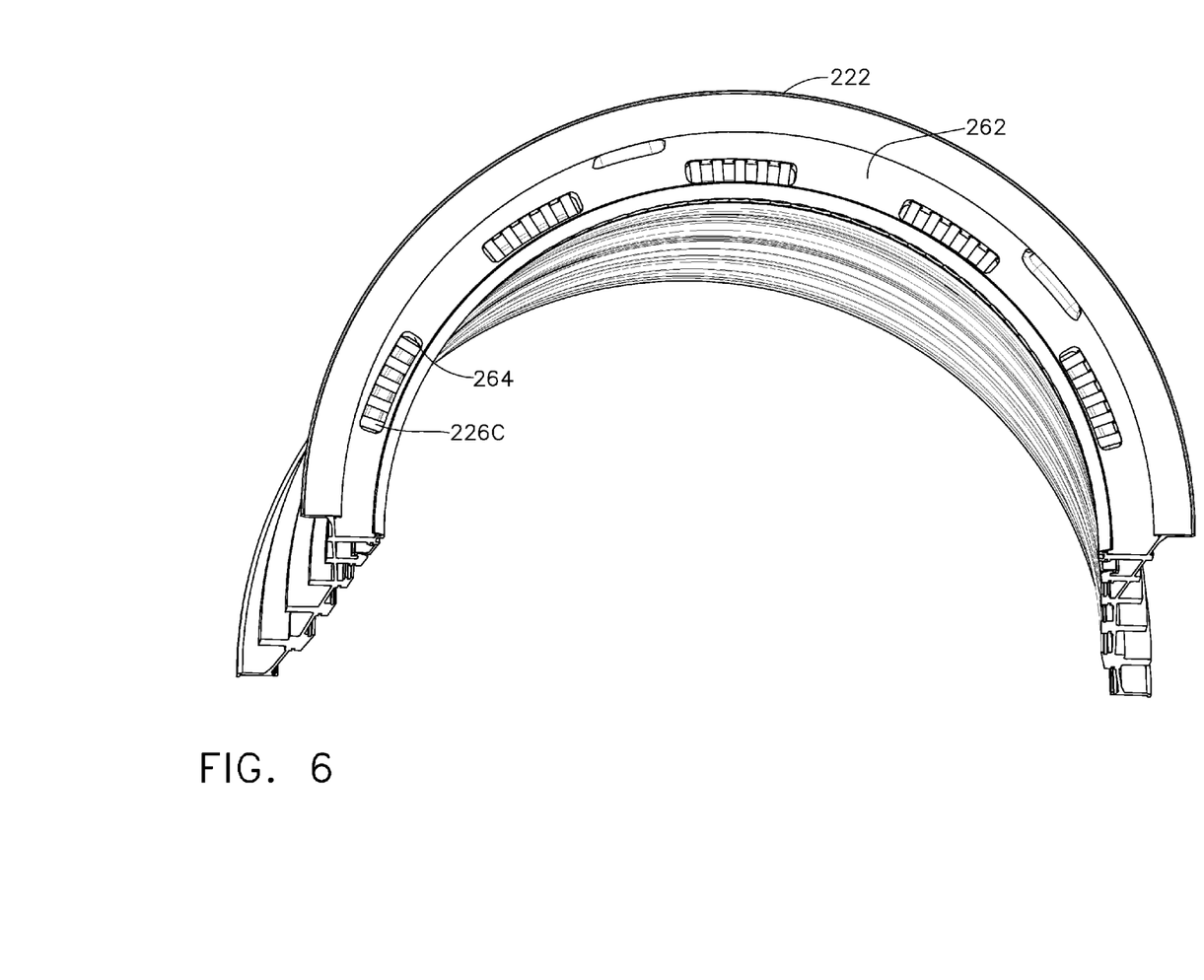
FIG. 6 is a perspective view of a portion of the compressor of FIG. 4.
Figure 7:
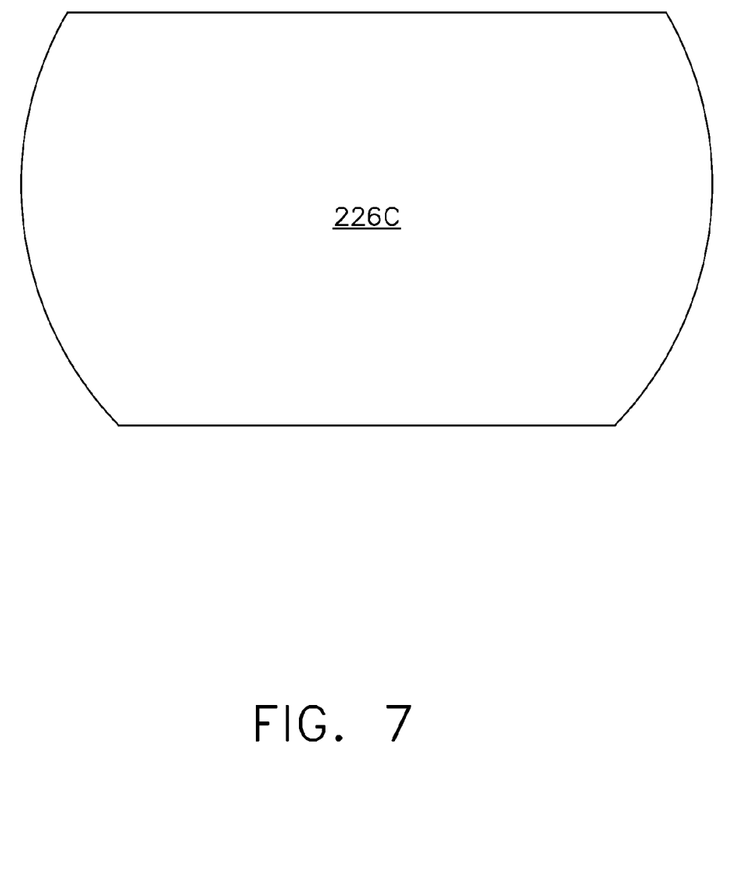
FIG. 7 is a cross-sectional view taken along lines 7-7 of FIG. 6.

The bushings 260 which receive the trunnions 226C pass through an annular wall-like boss 262 which is part of the casing 222. In order to pass bleed air across the stage S2, the boss 262 is penetrated at several locations around its periphery by apertures 264. The apertures 264 with the trunnions extending across them can be seen in FIG. 6. Optionally, the trunnions 226C may have an axially-elongated noncircular shape which is smaller is a circumferential direction than an axial direction, as seen in FIG. 7, in order to increase the lateral space between adjacent trunnions 226 and thereby permit more flow through the apertures 264. Optionally, to prevent leakage of bleed air between the trunnions 226 and the casing 222, hollow sleeves 265 may be positioned surrounding the trunnions 226, extending radially across the apertures 264.

Various means may be used to avoid leakage through the forward plenum 248. As noted above, a typical construction would have the liner assembly 220 comprised of a ring of segments and the casing 222 formed in two sections bolted together at a split line flange 259. To avoid leakage at the joints between these components, annular front and rear ducts 266 and 268 may be positioned in the front plenum 248. The front duct 266 comprises an arcuate outer wall 270 and an inner wall 272 with an L-shaped cross-section. Together the inner and outer walls 270 and 272 define a flowpath between the shroud 252 and the front face 274 of the boss 262. The rear duct 268 comprises an outer wall 276 with a generally U-shaped cross-section and an inner wall 278 with a generally linear cross-section extending aft and radially outward at an angle. Together the inner and outer walls 278 and 276 define a flowpath between the aft face 280 of the boss 262 and the inner surface 282 of the casing 222. Both the front and rear ducts 266 and 268 may be made from two or more arcuate segments assembled into a complete annular shape.

The bleed configurations described above can be combined and/or adapted as need for any desired bleed location. A particular compressor may have one or multiple bleed locations within either the VSV stages or the non-VSV stages. While locating the bleed port aft of the variable stages maintains compressor length and minimizes VSV complexity, bleeding directly out of the cavity reduces bleed system/leakage losses. In contrast with prior art bleed arrangements, air may be extracted at a desired pressure without regards to the axial location within the compressor. Analysis indicates that the bleed arrangements described here can result in a significant reduction in engine SFC.

The foregoing has described a bleed arrangement for a gas turbine engine compressor. While specific embodiments of the present invention have been described, it will be apparent to those skilled in the art that various modifications thereto can be made without departing from the spirit and scope of the invention. Accordingly, the foregoing description of the preferred embodiment of the invention and the best mode for practicing the invention are provided for the purpose of illustration only and not for the purpose of limitation.

What is claimed is:

1. A compressor apparatus, comprising:
   a compressor spool mounted for rotation about a centerline axis and carrying a plurality of axially-spaced-apart blade rows, each blade row comprising an annular array of airfoil-shaped compressor blades;
   a casing surrounding the compressor blades, the casing carrying a liner assembly which defines a boundary of a primary gas flowpath through the compressor;
   a plurality of axially-spaced-apart stator rows carried by the liner assembly, each stator row comprising an annular array of airfoil-shaped stator vanes, wherein the stator rows alternate axially with the blade rows, wherein at least some axially adjacent ones of the stator rows are variable stator rows, the stator vanes of which are mounted on trunnions passing through the casing, so as to be pivotable relative to the casing;
   an actuator arm coupled to each of the trunnions, outside the casing, wherein the actuator arms of a first one of the variable stator rows extend axially forward and the actuator arms of an axially adjacent second one of the second variable stator rows extend axially rearward, so as to create an open void at the exterior of the casing, which is in general axial alignment with at least one first bleed slot
that passes through the liner assembly between first and second ones of the variable stator rows;
a first flow path defined by the casing, communicating with the at least one first bleed slot and with an exterior of the casing; and
wherein the casing includes at least one first extraction port formed at an exterior surface of the casing in flow communication with the first flow path and positioned within forward and aft boundaries of the open void in the axial direction.

2. The apparatus of claim 1 wherein the liner assembly is spaced-apart from the remainder of the casing in a radial direction so as to define an open first plenum therebetween, the first plenum defining the boundaries of the first flow path.

3. The apparatus of claim 2 wherein the liner carries an annular shroud surrounding one of the blade rows, and the at least one first bleed slot passes through the shroud.

4. The apparatus of claim 2 further comprising an annular duct with spaced-apart forward and aft walls disposed in the first plenum.

5. The apparatus of claim 1 further including:
at least one additional bleed slot passing through the liner structure axially downstream of all of the variable stator rows; and
a second flow path defined by the casing communicating with the at least one additional bleed slot and with at least one additional extraction port which is disposed at an exterior surface of the casing, the second flow path being isolated from the first flow path.

6. A compressor apparatus, comprising:
a compressor spool mounted for rotation about a centerline axis and carrying a plurality of axially-spaced-apart blade rows, each blade row comprising an annular array of airfoil-shaped compressor blades;
a casing surrounding the compressor blades, the casing carrying a liner assembly which defines a boundary of a primary gas flowpath through the compressor;
a plurality of axially-spaced-apart stator rows carried by the liner assembly, each stator row comprising an annular array of airfoil-shaped stator vanes, wherein the stator rows alternate axially with the blade rows, wherein at least some axially adjacent ones of the stator rows are variable stator rows, the stator vanes of which are mounted on trunnions passing through the casing, so as to be pivotable relative to the casing;
an actuator arm coupled to each of the trunnions, outside the casing;
at least one first bleed slot passing through the liner assembly between axially adjacent first and second ones of the variable stator rows;
wherein the liner assembly is spaced-apart from the remainder of the casing in a radial direction so as to define an open first plenum therebetween, the first plenum defining the boundaries of a first flow path communicating with the at least one first bleed slot and with the exterior of the casing, wherein:
the trunnions are mounted in annular bosses extending in a generally radial direction between the liner structure and the remainder of the casing;
the at least one first bleed slot is positioned axially forward of a selected one of the bosses, the selected one of the bosses being in the second one of the variable stator rows;
the selected one of the bosses has at least one aperture formed therein, such that some of the trunnions extend radially across the at least one aperture;
the first flow path passes through the at least one aperture in the selected one of the bosses and extends axially aft of the selected one of the bosses; and
the casing includes at least one first extraction port formed at the exterior of the casing in flow communication with the first flow path and positioned immediately axially aft of the selected one of the bosses.

7. The apparatus of claim 6 further comprising:
a forward duct with spaced-apart inner and outer walls disposed between the first bleed slot and a forward face of the selected boss; and
a rear duct with spaced-apart inner and outer walls disposed between an aft face of the selected boss and an interior surface of the casing.

8. The apparatus of claim 6 wherein at least the trunnions which extend across the at least one aperture have a noncircular cross-sectional shape which is narrower in a circumferential direction than in an axial direction.

9. The apparatus of claim 6 wherein a sleeve surrounds each of the trunnions that extends across the at least one aperture.

* * * * *